US009070221B1

(12) United States Patent
Soares

(10) Patent No.: US 9,070,221 B1
(45) Date of Patent: Jun. 30, 2015

(54) ANIMATION ENGINE WITH HAIR ANIMATION USING ATTENUATION FIELDS

(71) Applicant: Pixar, Emeryville, CA (US)

(72) Inventor: Olivier Soares, Albany, CA (US)

(73) Assignee: PIXAR, Emeryville, CA (US)

( * ) Notice: Subject to any disclaimer, the term of this patent is extended or adjusted under 35 U.S.C. 154(b) by 111 days.

(21) Appl. No.: 13/784,462

(22) Filed: Mar. 4, 2013

Related U.S. Application Data

(60) Provisional application No. 61/664,682, filed on Jun. 26, 2012.

(51) Int. Cl.
| | |
|---|---|
| *G06T 15/00* | (2011.01) |
| *G06T 13/20* | (2011.01) |
| *G06T 17/00* | (2006.01) |
| *G06T 19/00* | (2011.01) |
| *G06T 13/40* | (2011.01) |

(52) U.S. Cl.
CPC ............... *G06T 13/20* (2013.01); *G06T 17/00* (2013.01); *G06T 19/00* (2013.01); *G06T 13/40* (2013.01)

(58) Field of Classification Search
CPC ......... G06T 13/40; G06T 13/20; G06T 17/00; G06T 17/20; G06T 19/00
USPC ......... 345/419, 420, 473, 474, 475, 581, 582; 427/96.1
See application file for complete search history.

(56) References Cited

U.S. PATENT DOCUMENTS

| | | | | |
|---|---|---|---|---|
| 7,648,730 B2 * | 1/2010 | Konno et al. | ................ | 427/96.1 |
| 8,711,151 B2 * | 4/2014 | Bruderlin et al. | ............. | 345/473 |
| 8,743,124 B2 * | 6/2014 | Audoly et al. | ................ | 345/473 |
| 8,803,887 B2 * | 8/2014 | McAdams et al. | ............ | 345/473 |

OTHER PUBLICATIONS

Iben, H. et al., "Artistic Simulation of Curly Hair", Technical Memo 12-03a, Pixar Animation Studios (Jun. 2012, unpublished) [ later published in *SCA* '13, Proceedings of the 12th ACM SIGGRAPH/ Eurographics Symposium on Computer Animation, (Jul. 19, 2013), pp. 63-71, 9 pages, New York, NY, USA].

* cited by examiner

*Primary Examiner* — Phu K Nguyen
(74) *Attorney, Agent, or Firm* — Kilpatrick Townsend Stockton LLP

(57) ABSTRACT

Computer-generated images based on force field effects are generated by evaluating force field data and animated data. The force field data includes force field directional vectors and the animated data includes density values for an animated model. The force field data and the animated data are splattered on separate multi-dimensional grids. An animation system determines a vector path, starting at a point in the grid containing the animated model, based on the directional vectors and the density values along the vector path are integrated to determine an attenuation factor for the point. The attenuation factor provides a value for accurately determining the movement of the animated model at the point when the force field is present.

21 Claims, 7 Drawing Sheets

ANIMATION ENGINE WITH HAIR ANIMATION USING ATTENUATION FIELDS

CROSS-REFERENCES TO RELATED APPLICATIONS

This application is a non-provisional application of and claims the benefit of priority of U.S. Provisional Patent Application No. 61/664,682, filed on Jun. 26, 2012, which is incorporated by reference in its entirety for all purposes.

BACKGROUND

Computer-generated animation generally involves specifying objects, their behavior, lighting, etc., and submitting data representing animator selections to an animation system that reads that data and performs the necessary calculations to determine how objects in a virtual or simulated environment would behave, move, look, etc. The animation result is then often rendered for display on a 2D or 3D display. In modern animation, the demands for visual expression prevent an animator from manually specifying the specific details of each pixel in each frame of animation. Instead, the animator specifies objects, lighting, effects, and their characteristics and the animation system computes frames of animation images that might represent what the animator specified.

Movement of an object could be specified point-by-point, frame-by-frame, but that is tedious and can be nearly impossible to be made to look like "natural" movement. Instead, with modern animation, an animator specifies inputs or constraints, such as the (x, y, z, t) coordinates of an elbow, leg, bone, anchor point, etc. for a collection of object points at a collection of times, and a kinematics engine would specify positions of those objects in each frame, applying those constraints. In some cases, there may be too many points to effectively manually specify each of the points, such as where the animation involves hair or cloth or other flowing objects.

Realistic animation based on force field effects is important for rendering realistic animated images. Directional winds are the most commonly used force field models for animating believable hair motion. While prior models produce a nice sense of where the wind is coming from, they can't capture some important phenomenon, such as how each hair occludes the wind (i.e., the wind intensity) when the wind traverses a mass of hairs or objects around it.

In some cases, hair is an important feature or extension of a character. Creating animation for hair that possesses its own dramatic and expressive personality but still appears realistic and physically convincing can pose a challenge. Hairs could be individually placed, but that can be an intractable task in many cases.

Previous models include using a shaper (e.g., a simple geometric shape) such as a sphere to simulate a head of an animated figure. In such models, the attenuation factor for a given point is based on the distance from the center of the sphere. This type of model, however, is less accurate and requires more manual configurations.

In other models, force fields (e.g., wind) are treated as a constant everywhere portions of an object (e.g., hair, string, cloth) are present. This may result, however, in inaccurate modeling of force field effects.

Accordingly, what is desired are improved methods and apparatuses for solving some of the problems discussed above with respect to rendering realistic animated images, while reducing at least the drawbacks described above.

BRIEF SUMMARY

A computer-implemented method for determining movement of an object visible in the generated images based on force field effects, is provided wherein force field effects are represented by directional vectors on a force field grid, the method comprising at least determining a density grid of the object, wherein each point of a plurality of points of the density grid includes a density value, determining a force field grid, wherein each force field point of the force field grid includes a force field direction, applying the force field grid to the density grid to determine an attenuation factor for each point of the plurality of points, and using the attenuation factor for each point to determine movement of the object based on force field effects at each point.

In an embodiment, determining the attenuation factor for each point of the plurality of points comprises, for a given point along a path starting at a first point, wherein the path is opposite to the force field direction at the given point, determining the force field direction from the force field grid at the given point in the force field grid comparable in location to the given point in the density field, and integrating the density values along the path.

In some embodiments, the force field is a wind field indicating the directional force of winds interacting with the animated model.

DETAILED DESCRIPTION

Figure 1:
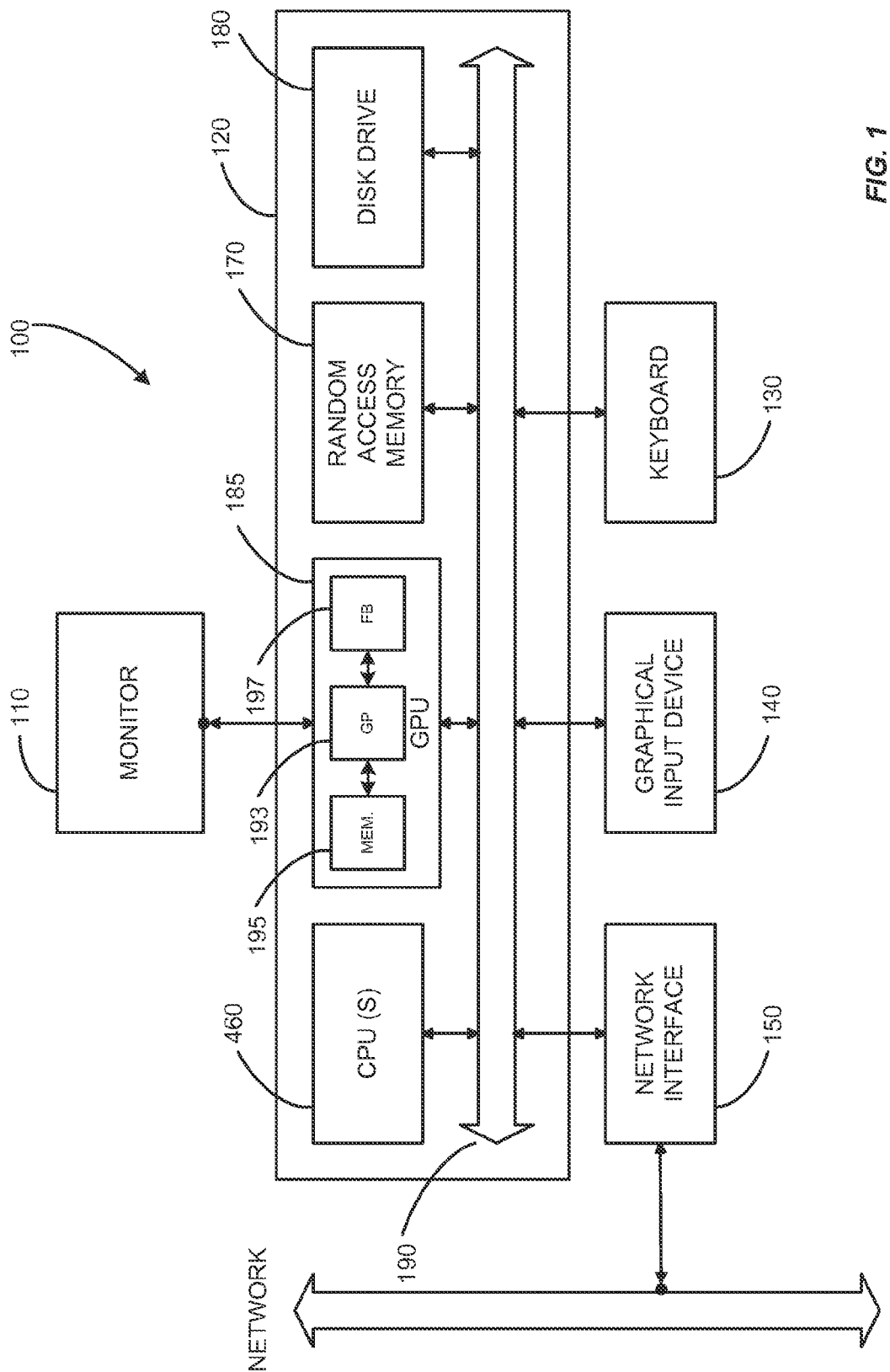
FIG. 1 illustrates a general-purpose computing system suitable for implementing some embodiments.

FIG. 1 is a block diagram of a computer system 100 that may be used to implement or practice various embodiments of an invention whose teachings may be presented herein. FIG. 1 is merely illustrative of a general-purpose computer system or specific information processing device for an embodiment incorporating an invention whose teachings may be presented herein and does not limit the scope of the invention as recited in the claims. One of ordinary skill in the art would recognize other variations, modifications, and alternatives.

In one embodiment, computer system 100 can include a monitor 110, a computer 120, a keyboard 130, a graphical input device 140, network interface 150, and/or the like. Monitor 110 may typically include familiar display devices, such as a television monitor, a cathode ray tube (CRT), a liquid crystal display (LCD), or the like. The monitor 110 may provide an interface to the graphical input device 140, such as incorporating touch screen technologies.

The computer 120 may typically include familiar computer components, such as a processor 160 and one or more memories or storage devices, such as a random access memory ("RAM") 170, one or more disk drives 180, a graphics processing unit ("GPU") 185, and/or the like. Computer 120 may include a system bus 190 interconnecting the above components and providing functionality, such as inter-device communication.

In further embodiments, the computer 120 may include one or more microprocessors (e.g., single core and multi-core) or micro-controllers, such as PENTIUMT™, ITANIUM™, or CORE 2™ processors from Intel of Santa Clara, Calif. and ATHLON™, ATHLON XP™, and OPTERON™ processors from Advanced Micro Devices of Sunnyvale, Calif. Further, the computer 120 may include one or more hypervisors or operating systems, such as WINDOWS™, WINDOWS NT™, WINDOWS XP™ WINDOWS VISTA™, or the like from Microsoft or Redmond, Wash., SOLARIS™ from Sun Microsystems, LINUX™ UNIX™ and UNIX-based operating system.

In various embodiments, the graphical input device 140 may typically be embodied as a computer mouse, a trackball, a track pad, a joystick, a wireless remote, a drawing tablet, a voice command system, an eye tracking system, or the like. The graphical input device 140 may allow a user of computer system 100 to select objects, icons, text, user interface widgets, model or rigging elements or handles, or other user interface elements that appear on the monitor 110 via a command, such as a click of a button or the like.

In some embodiments, the network interface 150 may typically include a communications interface, an Ethernet card, a modem (telephone, satellite, cable, ISDN), (asynchronous) digital subscriber line (DSL) unit, FireWire interface, USB interface, or the like. For example, the network interface 150 may be coupled to a computer network, to a FireWire bus, a USB hub, or the like. In other embodiments, the network interface 150 may be physically integrated as hardware on the motherboard of the computer 120, may be implemented as a software program, such as soft DSL or the like, or may be implemented as a combination thereof.

In various embodiments, the computer system 100 may also include software that enables communications over a network, such as the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to the computer system 100.

The RAM 170 and disk drive 180 are examples of machine-readable articles or computer-readable media configured to store information, such as computer programs, executable computer code, human-readable source code, shader code, rendering engines, or the like, and data, such as image files, models including geometrical descriptions of objects, ordered geometric descriptions of objects, hierarchies of models, procedural descriptions of models, scene descriptor files, or the like. Other types of computer-readable storage media or tangible machine-accessible media include floppy disks, removable hard disks, optical storage media such as CD-ROMS, DVDs and bar codes, semiconductor memories such as flash memories, read-only-memories (ROMS), battery-backed volatile memories, networked storage devices, or the like.

In some embodiments, the GPU 185 may include a conventional graphics processing unit. The GPU 185 may include one or more vector or parallel processing units that may be user programmable. Such GPUs may be commercially available from NVIDIA™, ATI™, and other vendors. In this example, the GPU 185 can include one or more graphics processors (GP) 193, a number of memories and/or registers (MEM.) 195, and a number of frame buffers (FB) 197.

As explained, FIG. 1 is merely representative of a general-purpose computer system or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may include techniques described above as implemented upon a chip or an auxiliary processing board.

Figure 2:
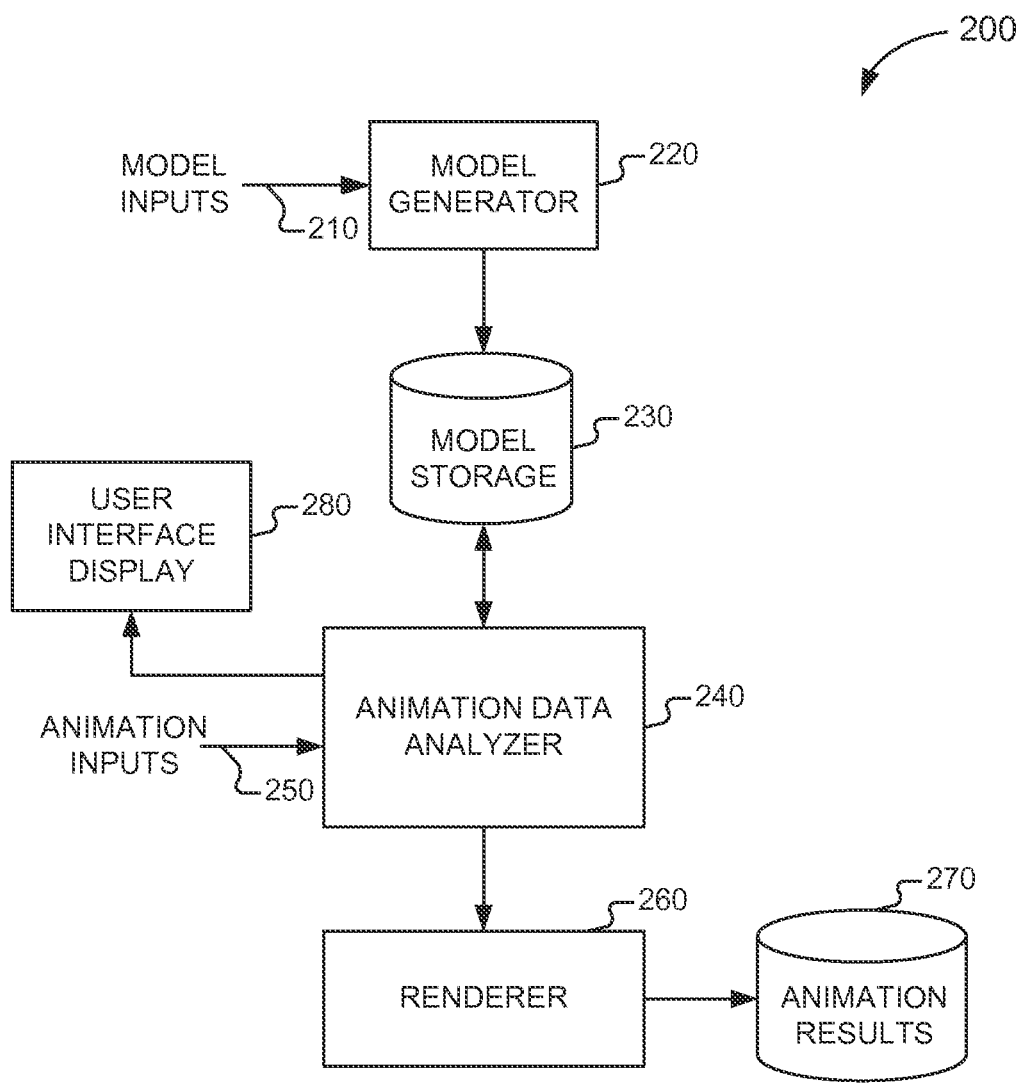
FIG. 2 illustrates a block diagram of components of a system that may be used to practice some embodiments.

FIG. 2 illustrates an animation system 200 that might be used to generate animated images. Various components of the animation system 200 can be implemented in software, hardware or a combination thereof. It should be understood, even if not explicitly displayed, that functionality can be represented by programming instructions stored in memory suitable for being read by a processor that in turn executes those programming instructions. Using the animation system 200, an animator can generate computer models and animation using those models. As illustrated, the animation system 200 may comprise a model generator 220, a model storage unit 230, an animation data analyzer 240, a renderer 260, an animation results storage unit 270, and a user interface display 280.

As noted, the animation system 200 comprises the model generator 220 that is capable of generating animated models from model inputs. The model inputs can be inputs from a user interface, from another computer process, from model storage 230 or other sources.

In some embodiments, the model generator 220 may receive force field data and animation data from a user as model inputs 210. In some embodiments, the force field data may include characteristics of a force field, including, but not limited to, velocity, force, and directional data. The model generator 220 may plot the force field data on a force field grid, where each point in the force field grid comprises the characteristics of the force field at the particular point. In some embodiments, the animation data may include characteristics of an animated model, including density data. The model generator 220 may plot the animation data including the density data on a density grid, where each point in the density grid comprises the characteristics of the animated model at the particular point. Of course, plotting done by the model generator might be done entirely using non-visual data manipulations.

In other embodiments, the force field grid and the density grid may be pre-generated and pre-modeled prior to being sent as animation input 250 to the animation system 200. In such embodiments, the animation system 200 may not access the model generator 220 for the force field and density grids. In other embodiments, one of the force field grid and the density grid may be sent as animation input 250, while the other is generated by the model generator 220 based on model inputs 210. The force field grid and the density grid may be stored in the model storage unit 230 and accessed when required.

The animation data analyzer 240 can read and modify animated model and the force field and density grids, present data, objects, controls, etc. on the user interface display 280 and receive animation inputs 250 in order to determine which models to use, where, how and how to manipulate them to form particular animated images. In some embodiments, the animation data analyzer 240 may be configured to determine the movement of an animated object visible in the animated data based on force field effects. In such embodiments, the animation data analyzer 240 may utilize data from the force field grid and the density grid to determine an attenuation factor for points in the animated model.

The data generated by the animation data analyzer 240 may be provided to the renderer 260 in order to generate animation results, which may be in the form of a sequence of animated images. In some embodiments, the animation results are stored in an animation results storage unit 270.

Figure 3:
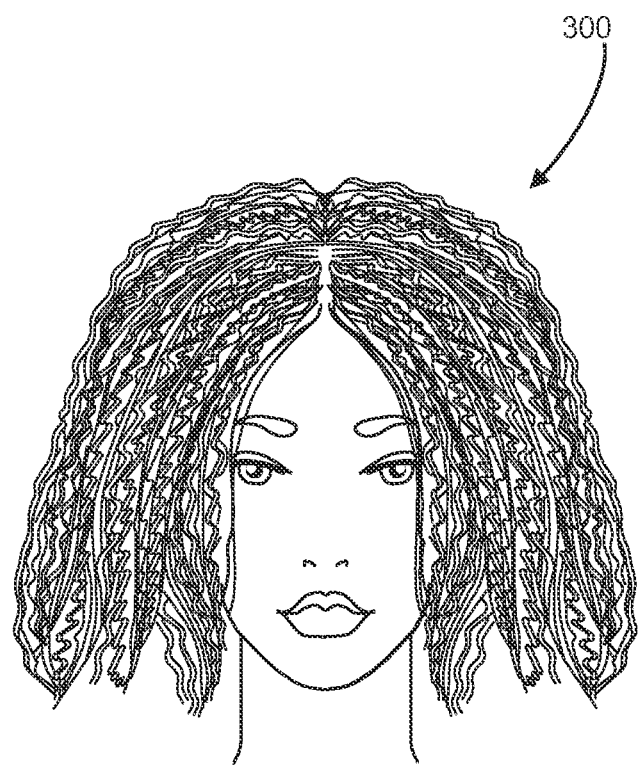
FIG. 3 illustrates an example animated model that may be used in some embodiments.

FIG. 3 illustrates an example animated model 300 of an animated character's head, including facial features and hair, which may be used in an embodiment. In the example of FIG. 3, the animated model 300 may be modeled and sent as animation inputs 250 to the animation data analyzer 240 or sent as model inputs 210 and generated by the model generator 220.

Figure 4:
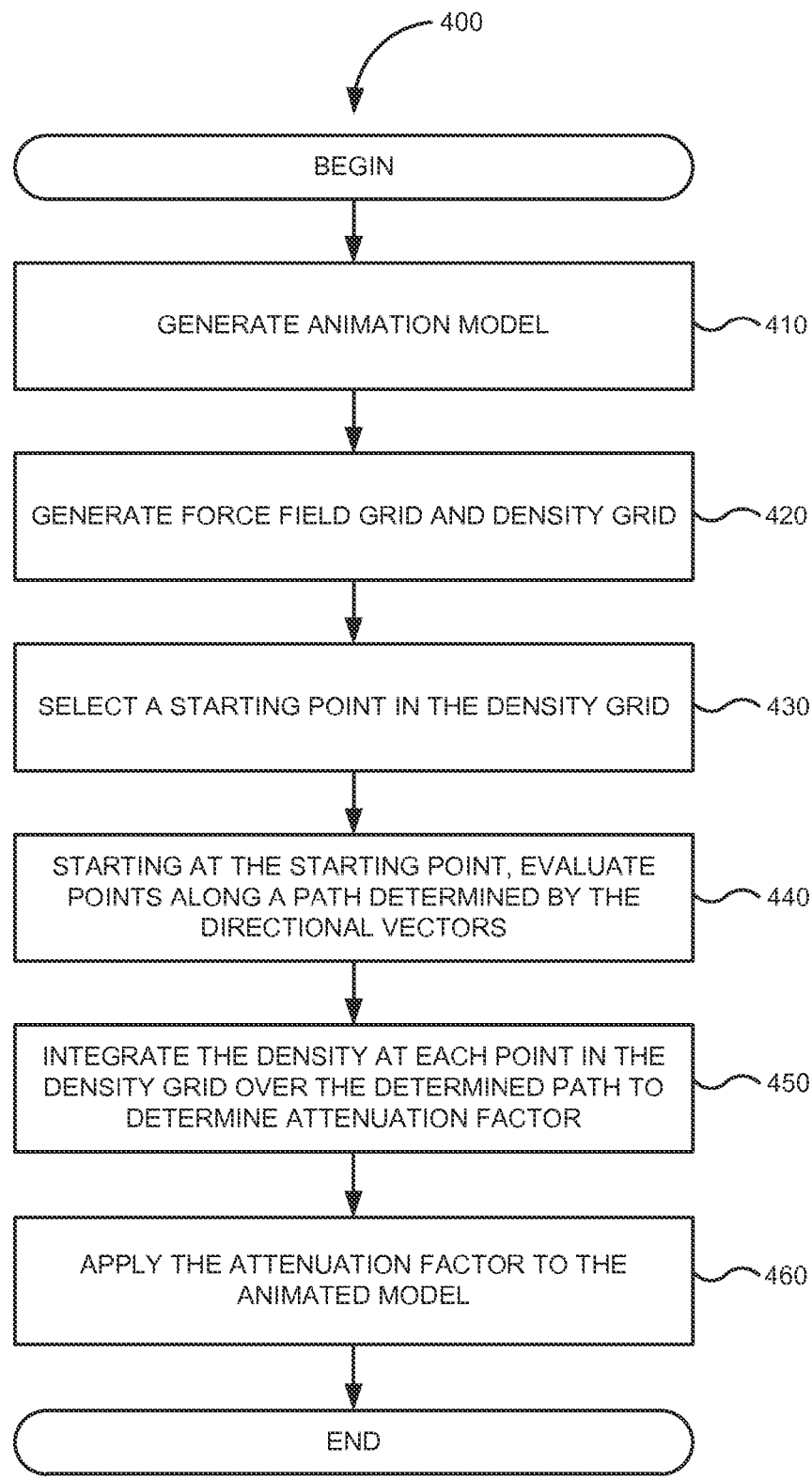
FIG. 4 is a simplified flowchart of a method in various embodiments for generating movement of an animated model based on force field effects.

FIG. 4 is a flowchart illustrating a method 400 of operation of an animation system for determining movement of an object visible in the generated images based on force field effects. In some embodiments, the method 400 is performed to evaluate each animation variable associated with a frame of animated data. The processing depicted in FIG. 4 may be performed by software modules (e.g., instructions or code) executed by a processor of a computer system, by hardware modules of an electronic device, or combinations thereof.

As illustrated in FIG. 4, the method begins 410 with the animation system 200 generating an animation model. In some embodiments, the animation model may be inputted by a user into the animation system 200 as a pre-formed animated model. In other embodiments, the animation model may be generated by the animation system 200 based on user specifications. Once the animated model is generated or received, the animation system 200 can store the animated for animation or image generation (e.g., rendering).

Figure 6:
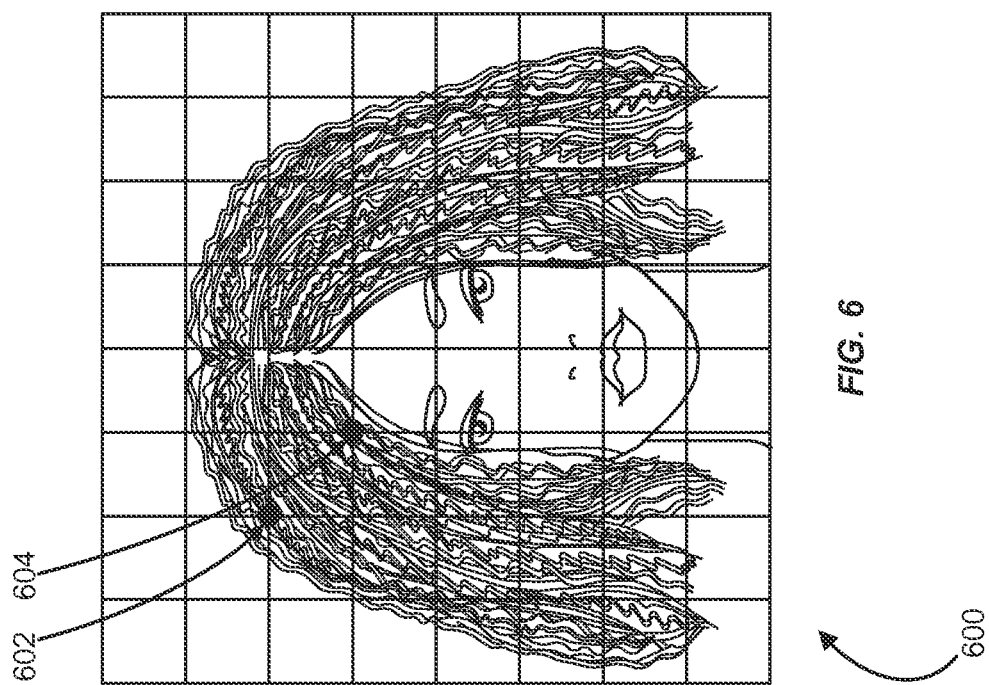
FIG. 6 illustrates an example density grid for the animated model corresponding to FIG. 3.
Figure 5:
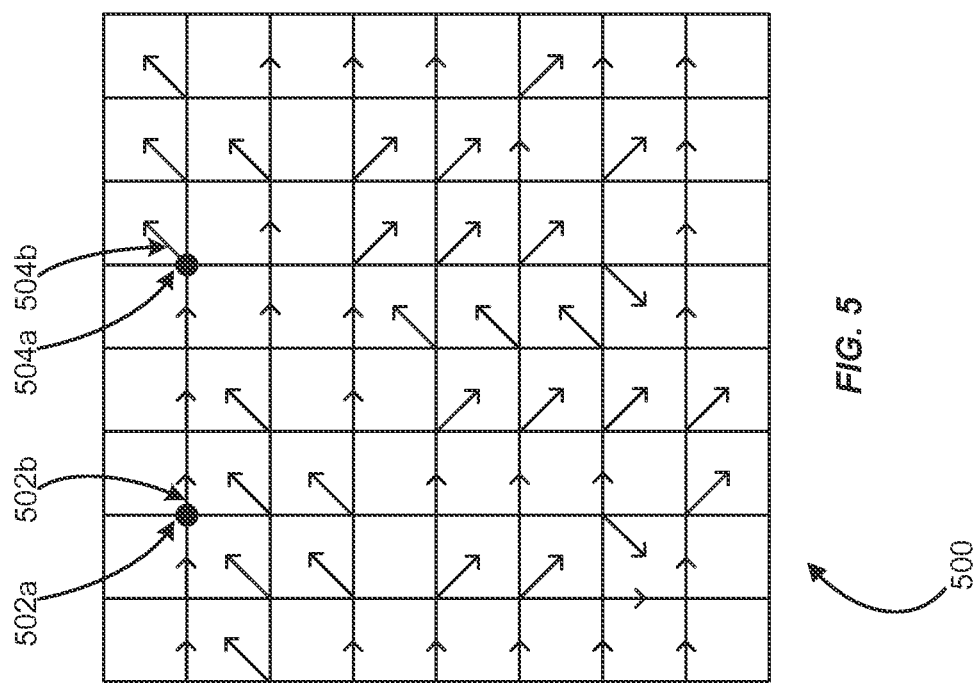
FIG. 5 illustrates an example force field grid with directional vectors indicating force field direction.

In step 420, the animation system 200 generates a force field grid and a density grid. In some embodiments of, the force field grid and a density grid may be inputted by a user into the animation system 200 as a pre-formed animated model. An exemplary force field grid 500 and density grid 600 are depicted in FIGS. 5 and 6, respectively. In other embodiments, the force field grid 500 and a density grid 600 may be generated by the animation system 200 based on user specifications. Each point on the force field grid 500 includes at least a directional vector (e.g., 502b and 504b in FIG. 5) indicating the force field direction at each point. In some embodiments, the force field is wind and the direction vector indicates a direction of the wind at each point. Each point on the density grid 600 includes a density value of the animated model 300 on the density grid. Once the force field grid 500 and the density grid 600 are generated or received, the animation system 200 can store the force field grid 500 and the density grid 600 for use in animation generation and rendering.

In step 430, the user selects a starting point in the density grid 600. The starting point may be any point in the density grid 600, as depicted by points 602 and 604 in FIG. 6.

Figure 8:
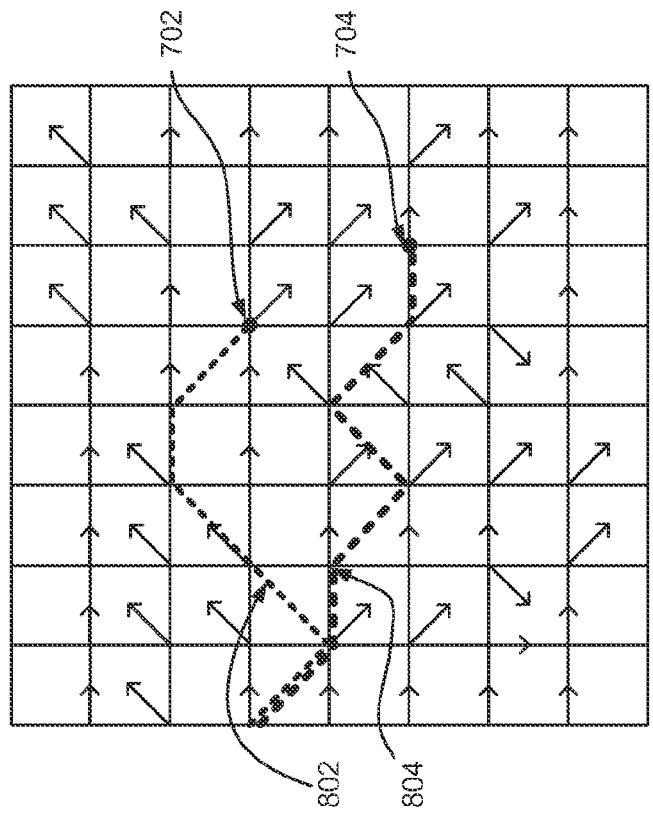
FIG. 8 illustrates example vector paths from starting points on the force field grid corresponding to FIG. 5.

In step 440, starting at the starting point, the animation system 200 evaluates the points along a path determined by the directional vectors. In some embodiments, the path is determined by determining the direction of a first directional vector at the starting point, and moving through the force field grid 500 in the direction opposite of the first directional vector until a second grid point in the force field grid 500 is reached. A similar evaluation can be conducted for the second grid point and a second direction vector at the second grid point, and so on until the determined path reaches an end of the force field grid 500 or when the density value for the animated model 300 is zero. Exemplary paths 802 and 804 are depicted in FIG. 8 based on starting points 702 and 704, respectively.

In step 450, the density values along the determined path based on the directional vectors on the force field grid 500 are integrated to determine an attenuation factor for the starting point of the determined path. The attenuation factor provides a measure of the occlusion at the starting point based on the density along the determined path. The attenuation factor at the starting point may be considered as the value obtained from integrating the density values at one or more density grid points, from the starting point to the edge of the density grid 600, divided by the total number of density grid points. In some embodiments, when the density value of the density grid point is zero, it may indicate that no portion of the animated model 300 is present at the grid point.

In step 460, the attenuation factor is applied to the animated model 300. In some embodiments, when the attenuation factor for one or more points for the animated model 300 in the density field is determined, the attenuations factors may be applied to the animated model 300. The animated model 300 may then be rendered with the determined movement of the animated model 300 based on the force field effects. For example, where the animated model 300 is a character with hair, as depicted in FIG. 2, and the force field effect is a wind effect, the rendering would show the movement of the character's hair caused by the wind effect.

FIG. 5 illustrates an example force field grid 500 with directional vectors indicating force field directions. In some embodiments, the force field grid 500 may be a two-dimensional grid. In other embodiments, the force field grid 500 may be a three-dimensional grid.

As described previously, each point on the force field grid 500 includes a corresponding directional vector indicating the force field direction at each point. For example, grid points 502a and 504a have directional vectors 502b and 504b, respectively, which indicate the force field directions at those points. In some embodiments, the directional vectors at each point may indicate a direction that wind is blowing. Thus, using a standard cardinal coordinate system, directional vector 502b is shown to be blowing in a eastern direction of 0 degrees, and directional vector 504b is shown to be blowing in a northeastern direction of approximately 45 degrees. Other embodiments contemplate the directional vectors indicate directions for other types of force fields. For example, other types of force fields may include, but are not limited to, gravitational fields, magnetic fields, and electric fields.

FIG. 6 illustrates an example density grid 600 for the animated model 300 described with respect to FIG. 2. In some embodiments, the density grid 600 may be a two-dimensional grid. In other embodiments, the density grid 600 may be a three-dimensional grid. In some embodiments, the density field 600 may indicate the density of hair, a head, or any other object.

As described previously, each point on the density grid 600 includes a corresponding density value of an object splattered on the density grid 600. The density value at each point is based on the particular animated model 300 splattered on the density grid 600. In FIG. 6, the object is the head and hair of the animated model 300 described with respect to FIG. 2. Each point on the density grid 600 is the density of hair at the point. For example, points 602*a* and 602*b* would include data indicating the particular density value of hair located at points 602*a* and 602*b*. In some embodiments, the density value at each point may vary from 0 to 100, with 0 indicating no density and 100 indicating a large amount of density at the point. Other embodiments contemplate the use of other scales indicating a range from low density to high density, where other number might be used instead of 0 and 100. In other embodiments, the density value at each point is based on the number of particles present in the animated model 300 at each point in the density grid.

The force field grid 500 of FIG. 5 and the density grid 600 of FIG. 6 are depicted with a particular number of grid lines and grid points. However, other embodiments may include numbers of grid lines and grid points fewer than or greater than the grids depicted in FIGS. 5 and 6. In some embodiments, a greater number of grid points on the force field grid 500 of FIG. 5 and the density grid 600 of FIG. 6 provide a more refined set of data points for generating the animation data. In some embodiments, the force field grid 500 and the density grid 600 may be identical in size or one grid may be larger than the other.

Figure 7:
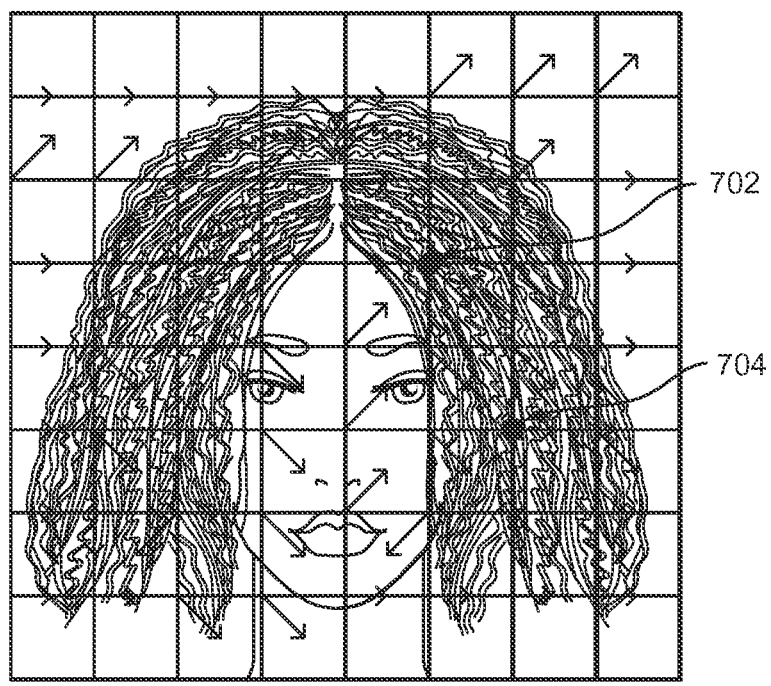
FIG. 7 illustrates an example overlay of the force field grid corresponding to FIG. 5 with the density grid corresponding to FIG. 6.

FIG. 7 illustrates an example overlay 700 of the force field grid 500 corresponding to FIG. 5 with the density grid 600 corresponding to FIG. 5. The overlay 700 illustrates the correspondence between points on the force field grid 500 and points on the density grid 600. Points 702 and 704 are two exemplary points on the overlay 700. Each point in the overlay 700 includes at least a density value of the hair of the animated model 300 at the point, and the directional vector indicating the direction that the wind is blowing at the point. Additional data at each point may include, but is not limited to wind force, wind speed, etc.

FIG. 8 illustrates example vector paths from starting points on the force field grid 800. Each of the depicted vector paths, 802 and 804, are unique to the selected starting points, 702 and 704. The vector paths, 802 and 804, are determined based on the starting points, 702 and 704, respectively, and on the directional vector associated with each point in the force field grid 800.

For example, vector path 802 begins at starting point 702. At starting point 702, assuming a standard cardinal direction system where the straight vertical line up is north, the directional vector associated with the point is in a southeast direction, which causes the animation system to begin the vector path 802 in a northwest direction (i.e., the direction opposite the directional vector of the starting point 702). The vector path 802 continues until it reach the next grid point, at which point, the animation system evaluates the directional vector and the next grid point to determine the next direction of the vector path 802. The process continues until the vector path 802 reaches the edge of the force field grid 800. A similar process is used to generate vector path 804.

Figure 9:
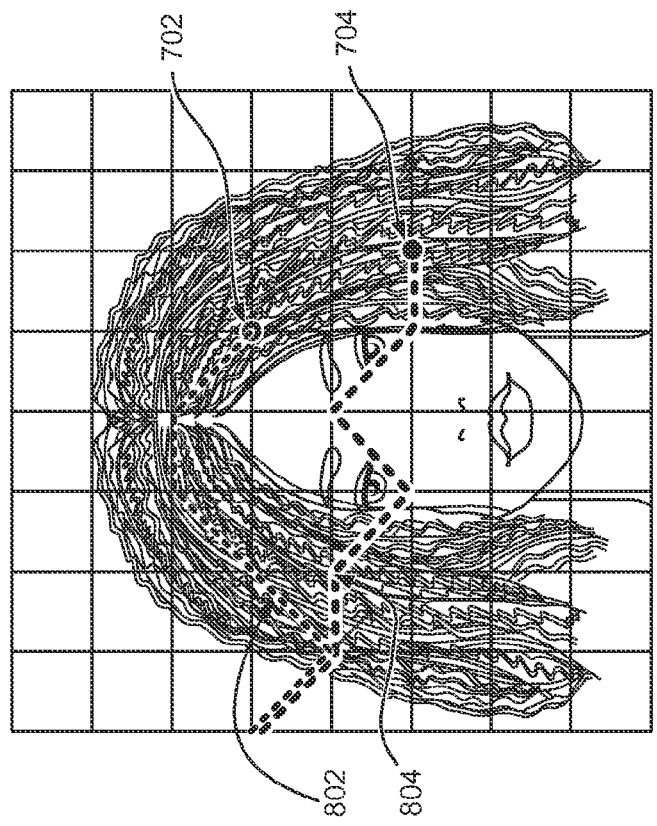
FIG. 9 illustrates example vector paths from starting points on the density grid corresponding to FIG. 6.

FIG. 9 illustrates the same vector paths 802 and 804 as illustrated in FIG. 8, overlaid on the density grid 900. In FIG. 9, starting points 702 and 704 are in the same location as the points in FIG. 8. Each starting point 702 and 704 in FIG. 9 includes a density value for the point. The density value at each point may provide a numerical indication of the density of matter of the animated model 300 that is present at each point.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

Where "each" is used with reference to a set of things with a characteristic and/or a feature, it is not meant to exclude the case of a set of things each having the characteristic or feature and additional things beyond the set that do not necessarily have that characteristic or feature.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

The specification and drawings are, accordingly, to be regarded in an illustrative rather than a restrictive sense. It will, however, be evident that various modifications and changes may be made thereunto without departing from the broader spirit and scope of the application as set forth in the claims.

What is claimed is:

1. In an animation system that generates images based on animation inputs and object data, a computer-implemented method of determining movement of an object visible in the generated images based on force field effects, the method comprising:
    determining a density grid of the object, wherein each point of a plurality of points of the density grid includes a density value;
    determining a force field grid based on forces determined separately from the object, wherein each force field point of the force field grid includes a force field direction;
    applying the force field grid to the density grid to determine an attenuation factor for each point of the plurality of points; and determining movement of the object based on force field effects of the force field grid at each point using the attenuation factor for each point of the density grid.

2. The computer-implemented method of claim 1, wherein applying the force field to the density grid to determine the attenuation factor for each point of the plurality of points comprises:
for a given point along a path starting at a first point, wherein the path is opposite to the force field direction at the given point, determining the force field direction from the force field grid at the given point in the force field grid comparable in location to the given point in the density field; and
integrating the density values along the path.

3. The computer-implemented method of claim 2, wherein the object is hair.

4. The computer-implemented method of claim 2, wherein the force field is a wind effect.

5. The computer-implemented method of claim 2, wherein the density grid is three-dimensional.

6. The computer-implemented method of claim 2, wherein the force field grid is three-dimensional.

7. The computer-implemented method of claim 1, wherein using the attenuation factor for each point to determine movement of the object based on force field effects at each point further comprises:
applying the attenuation factor for each point to the animated model; and
rendering images of the animated model based on the force field effects.

8. An animation system for generating images based on animation inputs and object data, comprising:
one or more processors associated with one or more computer systems; and
a memory configured to store a set of instructions to be executed by the one or more processors, the set of instructions comprising:
a) instructions for determining a density grid of the object, wherein each point of a plurality of points of the density grid includes a density value;
b) instructions for determining a force field grid based on forces determined separately from the object, wherein each force field point of the force field grid includes a force field direction;
c) instructions for applying the force field grid to the density grid to determine an attenuation factor for each point of the plurality of points; and
d) instructions for determining movement of the object based on force field effects of the force field grid at each point using the attenuation factor for each point of the density grid.

9. The animation system of claim 8, wherein applying the force field to the density grid to determine the attenuation factor for each point of the plurality of points comprises:
for a given point along a path starting at a first point, wherein the path is opposite to the force field direction at the given point, determining the force field direction from the force field grid at the given point in the force field grid comparable in location to the given point in the density field; and
integrating the density values along the path.

10. The animation system of claim 9, wherein the object is hair.

11. The animation system of claim 9, wherein the force field is a wind effect.

12. The animation system of claim 9, wherein the density grid is three-dimensional.

13. The animation system of claim 9, wherein the force field grid is three-dimensional.

14. The animation system of claim 8, wherein using the attenuation factor for each point to determine movement of the object based on force field effects at each point further comprises:
applying the attenuation factor for each point to the animated model; and
rendering images of the animated model based on the force field effects.

15. A non-transitory computer-readable medium storing computer-executable program code for generating images based on animation inputs and object data, the non-transitory computer-readable medium comprising:
program code for determining a density grid of the object, wherein each point of a plurality of points of the density grid includes a density value;
program code for determining a force field grid based on forces determined separately from the object, wherein each force field point of the force field grid includes a force field direction;
program code for applying the force field grid to the density grid to determine an attenuation factor for each point of the plurality of points; and
program code for determining movement of the object based on force field effects of the force field grid at each point using the attenuation factor for each point of the density grid.

16. The non-transitory computer-readable medium of claim 15, wherein the program code for applying the force field to the density grid to determine the attenuation factor for each point of the plurality of points comprises:
program code for determining, for a given point along a path starting at a first point, wherein the path is opposite to the force field direction at the given point, determining the force field direction from the force field grid at the given point in the force field grid comparable in location to the given point in the density field; and
program code for integrating the density values along the path.

17. The non-transitory computer-readable medium of claim 16, wherein the object is hair.

18. The non-transitory computer-readable medium of claim 16, wherein the force field is a wind effect.

19. The non-transitory computer-readable medium of claim 16, wherein the density grid is three-dimensional.

20. The non-transitory computer-readable medium of claim 16, wherein the force field grid is three-dimensional.

21. The non-transitory computer-readable medium of claim 15, wherein the program code for using the attenuation factor for each point to determine movement of the object based on force field effects at each point further comprises:
program code for applying the attenuation factor for each point to the animated model; and
program code for rendering images of the animated model based on the force field effects.

* * * * *